(12) United States Patent
Dymetman et al.

(10) Patent No.: US 7,543,758 B2
(45) Date of Patent: Jun. 9, 2009

(54) DOCUMENT LOCALIZATION OF POINTING ACTIONS USING DISAMBIGUATED VISUAL REGIONS

(75) Inventors: Marc Dymetman, Grenoble (FR); Gabriela Csurka, Crolles (FR)

(73) Assignee: Xerox Corporation, Norwalk, CT (US)

( * ) Notice: Subject to any disclaimer, the term of this patent is extended or adjusted under 35 U.S.C. 154(b) by 619 days.

(21) Appl. No.: 11/312,057

(22) Filed: Dec. 20, 2005

(65) Prior Publication Data

US 2007/0138283 A1    Jun. 21, 2007

(51) Int. Cl.
*G06K 19/06* (2006.01)
(52) U.S. Cl. .................. 235/494; 235/487; 235/375
(58) Field of Classification Search .............. 235/487, 235/494, 375
See application file for complete search history.

(56) References Cited

U.S. PATENT DOCUMENTS

| | | | |
|---|---|---|---|
| 5,949,055 | A | 9/1999 | Fleet et al. |
| 6,330,976 | B1 | 12/2001 | Dymetman et al. |
| 6,585,163 | B1 | 7/2003 | Meunier et al. |
| 6,594,406 | B1 | 7/2003 | Hecht |
| 6,604,875 | B2 | 8/2003 | Meunier et al. |
| 6,647,130 | B2 | 11/2003 | Rhoads |
| 6,690,821 | B2 | 2/2004 | Goldberg et al. |
| 6,694,042 | B2 | 2/2004 | Seder et al. |
| 6,752,317 | B2 | 6/2004 | Dymetman et al. |
| 6,788,293 | B1 | 9/2004 | Silverbrook et al. |
| 6,820,815 | B2 | 11/2004 | Meunier et al. |
| 6,847,883 | B1 | 1/2005 | Walmsley et al. |
| 6,946,672 | B1 | 9/2005 | Lapstun et al. |
| 6,959,298 | B1 | 10/2005 | Silverbrook et al. |
| 6,963,845 | B1 | 11/2005 | Lapstun et al. |

OTHER PUBLICATIONS

Adnan M. Alattar, "Smart images using Digimarc's watermarking technology", Proceedings of the IS&T/SPII International Symposium on Electronic Imaging, vol. 3971, No. 25, pp. 264-273, (2000).
(Chen) Yu-Chee Tseng, Y.Y. Chen, H. K. Pan, "A secure Data Hiding Scheme for Binary Images", IEEE Transactions on Communications, vol. 50, No. 8, Aug. 2002, pp. 1227-1231.
(Csurka) G. Csurka, F. Deguillaume, J. K. Ruanaidh and T. Pun, "A Bayesian Approach to Affine Transformation Resistant Image and Video Watermarking", Lecture Notes in COmputer Science, vol. 1768 (1999).

(Continued)

*Primary Examiner*—Karl D. Frech
(74) *Attorney, Agent, or Firm*—Fay Sharpe LLP

(57) ABSTRACT

A system for document internal localization includes an optical input device for retrieving an observed region of a hardcopy document and a processing component which provides a location identifier for actionable observed regions by matching the retrieved region with a region of an electronically stored version of the hardcopy document. The hardcopy document and electronically stored version of the document include machine readable disambiguating information which has been added to actionable regions of the document which are indistinguishable from other actionable regions, based on their original markings, whereby a region is distinguishable from similar regions of the document. The disambiguating information is localized in regions of the document whose markings are not distinguishable without the disambiguating information.

19 Claims, 4 Drawing Sheets

OTHER PUBLICATIONS

M. Dymetman and M. Copperman, "Intelligent Paper", Proceedings of the 7th International Conference on Electronic Published, Held jointly with the 4th international Conference on Raster Imaging and Digital Typography: Electronic Publishing, Artistic Imaging, and Digital Typography, Mar. 30-Apr. 3, 1998R.D. Hersch, J. Andre and H. Brown, Eds. Lecture Notes in Computer Science, vol. 1375. Springer-Verlag, London, pp. 392-406.

A. Gupta and R. Jain, "Visual Information Retrieval", Communications of the ACM, May 1997, vol. 40, No. 5, pp. 71-79.

K. Mikolajczyk and C. Schmid, "A performance evaluation of local descriptors", IEEE Transactions on Pattern Analysis and Machine Intelligence, vol. 27, No. 10 (Oct. 2005).

P. Nillius and J. O. Eklundh, "Fast Block Matching with Normalized Cross-Correlation using Walsh Transforms", Report, ISRN KTRH/NA/P -02/11-SE (2002).

F. A. P. Petitcolas, R. J. Anderson and M. G. Kuhn, "Information Hiding —A Survey", Proceedings of the IEEEE, special issue on protection of multimedia content, 87(7): Jul. 1999, pp. 1062-1078.

S. Roy and E. Chang, "Watermarking with Retrieval Systems", in Multimedia Systems 9:433-440 (2004).

C. Schmid, R. Mohr and C. Bauckhage, "Evaluation of Interest Point Detectors", International Journal of Computer Vision, 37(2), 2000, pp. 151-172.

D. Sellars, "An Introduction to Steganography", http://www.totse.com/en/privacy/encryption/163947.html Nov. 14, 2005.

C. Shoemaker, "Hidden Bits: A Survey of Techniques for Digital Watermaking", Independent Study, EER-290, Spring 2002.

A. Natsev, R. Rastogi, K. Shim, "WALRUS: A Similarity Retrieval Algorithm for Image Databases", IEEE Transactions on Knowledge and Data Engineering, 16-3 (2004).

M. Wu and B. Liu, "Data Hiding in Binary Image for Authentication and Annotation", IEEE Transactions on Multimedia, vol. 6, No. 4, Aug. 2004, pp. 528-538.

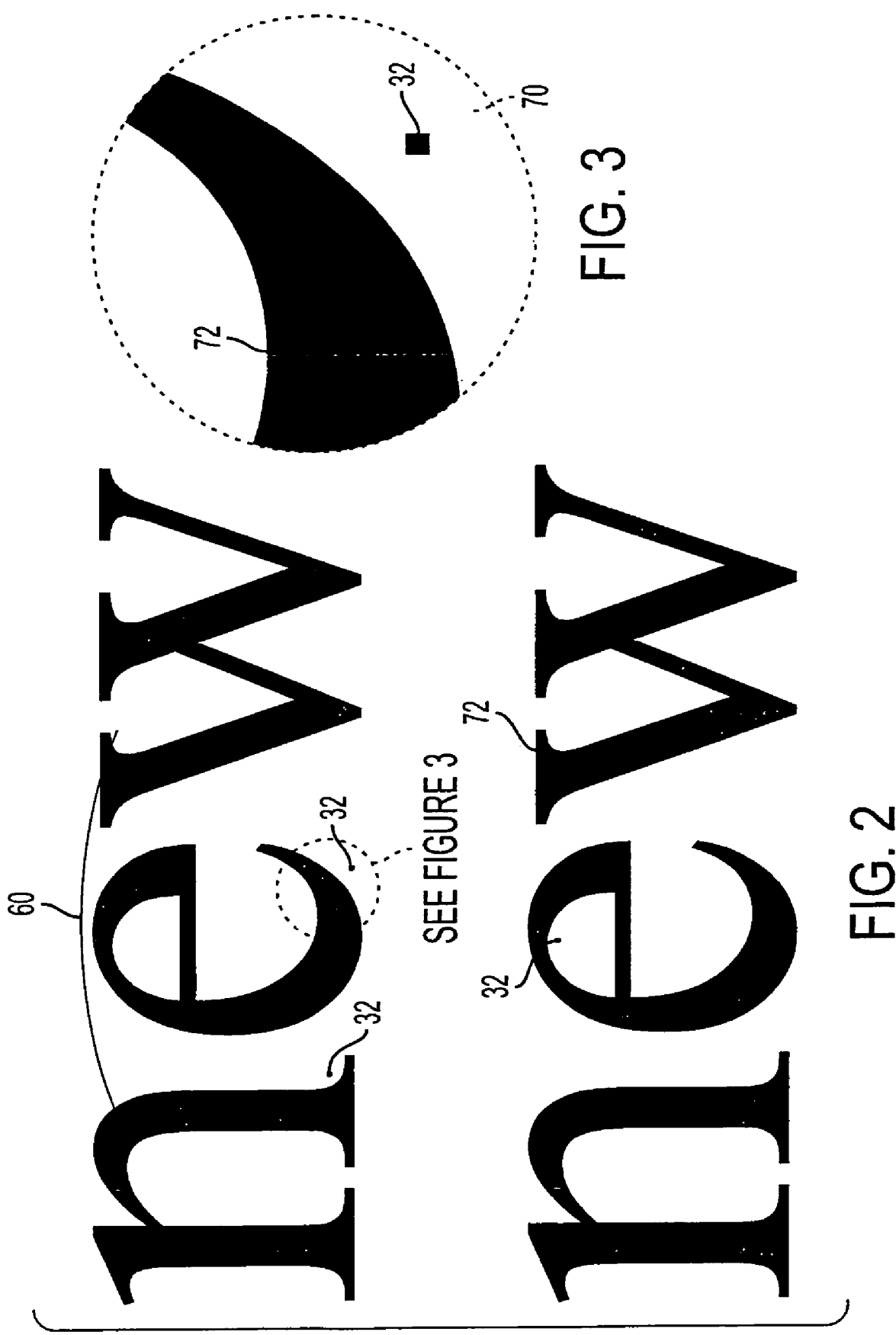

DOCUMENT LOCALIZATION OF POINTING ACTIONS USING DISAMBIGUATED VISUAL REGIONS

BACKGROUND

The exemplary embodiment relates to localization of a pointing action on a document for providing information associated with a pointer location. It finds particular application in conjunction with images on paper which are minimally altered to enable unique localization by a camera enabled pointer pen and will be described with reference thereto.

Machine readable information in the form of watermarks, barcodes, and the like has been embedded into images on paper for a variety of applications, such as document identification and precise document-internal pointing localization. The code is generally invisible or visually unobstructive and may be decoded by a camera-enabled pointer-pen. For example, presenting the document to the camera permits the user to recover a document identifier encoded in the watermark which can then be used to retrieve the document from a database which is accessed with the identifier. The image itself is not used for retrieval purposes, but only the watermark-embedded code.

The encoded information is used to associate various actions with the pointing gesture, such as displaying touristic information about a monument pointed on a map, ordering a mechanical part from a paper catalog, retrieving the stored translation of a selected piece of text, playing a recorded interpretation from the position indicated by the pointer on a musical partition, or generally any action that can be triggered by using a mouse with a computer screen.

Early work on what is often referred to as "intelligent paper" focused on the use of invisible inks. However, this requires special printing inks to be installed in the printer. More recently, visually unobstructive marks, such as dataglyphs, have been printed with conventional inks in locations of the image associated with information retrieval. However, these marks do modify the visual appearance of the document, and moreover are generally limited to areas of the document, such as text regions, where there is sufficient surrounding white space.

INCORPORATION BY REFERENCE

The following references, the disclosures of which are expressly incorporated herein in their entireties by reference, are mentioned:

U.S. Pat. Nos. 6,752,317 and 6,330,976 entitled "MARKING MEDIUM AREA WITH ENCODED IDENTIFIER FOR PRODUCING ACTION THROUGH NETWORK," by Dymetman, et al. disclose obtaining automatic actions through a network using an area of marking medium with machine-readable markings that encode an action/medium identifier. The action/medium identifier identifies an action that can be produced through the network, and also identifies the area of marking medium. For example, it may include a globally unique or network-wide page identifier as well as an action identifier that can be used to produce an action described by data associated with a counterpart digital page.

U.S. Pat. No. 6,694,042, entitled "METHODS FOR DETERMINING CONTENTS OF MEDIA," by Seder, et al. discloses printing documents and other objects with machine readable indicia, such as steganographic digital watermarks or barcodes, for enabling document management functions. The indicia can be added as part of the printing process, such as by printer driver software, by a Postscript engine in a printer. The indicia can encode data about the document, or can encode an identifier that references a database record containing such data. By showing the printed document to a computer device with a suitable optical input device (e.g., a webcam), an electronic version of the document can be recalled for editing, or other responsive action can be taken.

U.S. Pat. No. 6,647,130 entitled "PRINTABLE INTERFACES AND DIGITAL LINKING WITH EMBEDDED CODES," by Rhoads discloses a physical medium which is encoded with machine readable information that provides a human interface to a computer system. The information encoded into the medium indicates a computer implemented process, and is encoded according to a spectral encoding scheme, such as encoding by modifying color values of a graphic or other image printed on the medium. For example, a digital watermark or other steganographic data hidden in the image indicates a web page. In response to the user selecting the encoded information area, the machine readable information is decoded, and used to invoke a computer implemented process.

Sujoy Roy and Ee-Chien Chang, "Watermarking with Retrieval Systems," in Multimedia Systems 9: 433-440 (2004), relates to the association of messages with multimedia content for the purpose of identifying them. The reference notes that watermarking systems which embed associated messages into the multimedia content tend to distort the content during embedding. Retrieval system are said to avoid undesirable distortion but searching in large databases is fundamentally difficult.

BRIEF DESCRIPTION

Aspects of the exemplary embodiment relate to a system and a method for document internal localization, to a system for generating such a localization system and to an article, such as a hardcopy document.

In one aspect, a method for document internal localization includes identifying, for a multiplicity of regions of an electronically stored document, if there are regions which are indistinguishable, by an automated processing component, from other regions in the multiplicity of regions. In the event that regions which are indistinguishable are identified, for a set of regions which are indistinguishable from each other, machine readable disambiguating information is adding to at least one of the regions in the set whereby the regions in the set of regions are distinguishable by the automated processing component. The method further includes associating each of the regions in the multiplicity of regions with a corresponding location in the electronic document. A hardcopy document is generated from the electronic document. An observed region of the hardcopy document is compared with a first region in the multiplicity of regions with the automated processing component and, where the observed region of hardcopy document is indistinguishable from the first region, the location associated with the first region is retrieved.

In another aspect, a system for generating a document with internal localization capability includes a processing component which determines whether actionable regions of an electronically stored document associated with a pointing action are distinguishable, the processing component adding sufficient machine readable disambiguating information to the electronically stored document to render the actionable regions associated with a pointing action which are indistinguishable without the disambiguating information distinguishable. A memory stores the electronically stored document with the machine readable disambiguating information.

In another aspect, a system for document internal localization includes an optical input device for retrieving an observed region of a hardcopy document and a processing component which determines a location of the observed region by matching the retrieved region with a region of an electronically stored version of the hardcopy document. The hardcopy document and electronically stored version of the document include machine readable disambiguating information whereby a region is distinguished from similar regions of the document. The disambiguating information is localized in regions of the document which are not distinguishable without the disambiguating information.

In another aspect, an article of manufacture for obtaining automatic actions through a network using a processing component for connecting to the network and an optical input device for providing input signals to the processing component. The automatic actions are provided by an action device connected to the network. The article of manufacture includes print medium with visually recognizable machine-readable markings on the print medium. Visually unobtrusive machine readable markings are localized in regions of the print medium which are indistinguishable from other regions by the visually recognizable machine-readable markings alone. The visually unobtrusive machine readable markings are absent from at least some regions which are distinguishable by the visually recognizable machine-readable markings alone. The visually recognizable markings combine with the visually unobtrusive markings to render regions that are associated with an automatic action distinguishable from other regions that are associated with a respective automatic action. The associated processing component associates a region of the article observed by the optical input device with a location identifier and the associated action device provides the action automatically in response to the location identifier.

In another aspect, a system for document internal localization of a pointing gesture is provided. The system includes an optical input device which captures machine readable markings in a region of an associated hardcopy document. A processing component associates the captured machine readable markings with a location identifier. The location identifier automatically implements a computer implemented process. The hardcopy document includes disambiguating machine readable markings whereby otherwise indistinguishable regions are distinguishable by the processing component. The processing component is adapted to utilize visually recognizable machine readable markings for associating the region with the identifier for those regions which are distinguishable without disambiguating markings and to utilize a combination of machine readable visually recognizable markings with machine readable disambiguating markings for at least some of the regions which are indistinguishable without the disambiguating information.

BRIEF DESCRIPTION OF THE DRAWINGS

FIG. 2 demonstrates the addition of visual noise to two occurrences of a character trigram (the word "new") in a textual portion of a document;

FIG. 3 is an enlarged view of one character (the letter "e") in the first occurrence of the trigram of FIG. 2;

DETAILED DESCRIPTION

Figure 1:
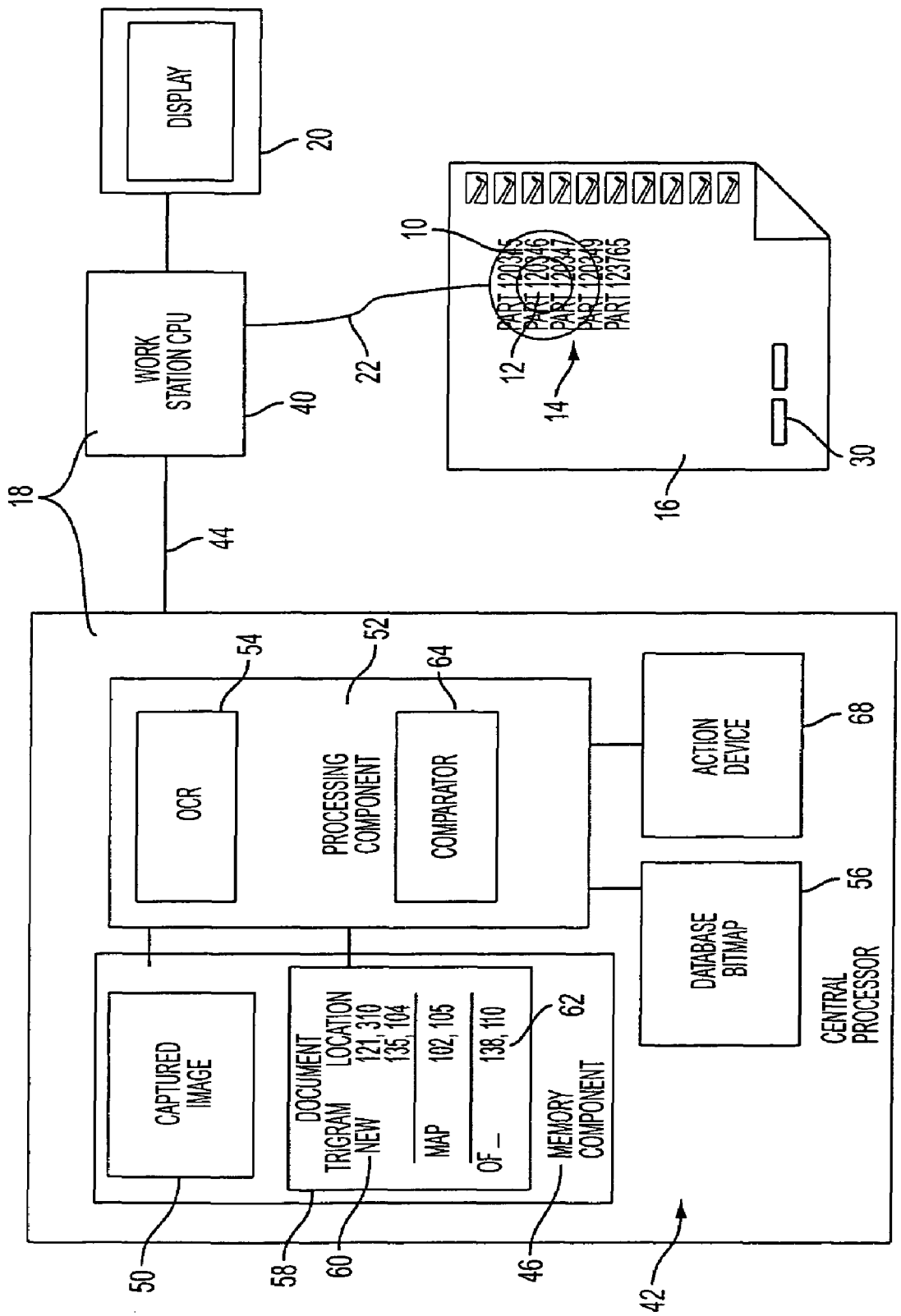
FIG. 1 is a schematic view of a system for document internal localization of a pointing gesture according to one aspect of the exemplary embodiment.

The exemplary embodiment relates to a system and a method for document-internal localization of a pointing gesture. Rather than relying on a uniform localization-code layer over the surface of the document, intrinsic visual characteristics of the document is used as the primary localization key. In addition, whenever the intrinsic visual characteristic of two different locations are indistinguishable to an optical input device, the document is modified by adding disambiguating information, for example, by adding a small amount of visual "noise" or a watermark, which is sufficient for discriminating between the two locations. In this way, the original document is modified in an almost unnoticeable way while acquiring localization capabilities.

An image or electronic document generally may include information in electronic form which is to be rendered on print media and may include text, graphics, pictures, and the like. At least a portion of the information, when rendered, is visually recognizable, which users of the document having normal vision can identify without resort to a magnifying glass.

A physical page or page is a print medium that includes only one sheet; a card, a poster, and an ordinary sheet are all pages within this meaning. A hardcopy document, or simply "a document," is a collection of one or more pages, with at least one page including markings indicating information.

The physical document can be formed by marking a physical medium, such as a usually flimsy physical sheet of paper, plastic, or other suitable physical print media substrate for images with a marking material, such as ink or toner, generally referred to as printing. The document may be rendered on a single sheet or multiple sheets by a standard office printer (e.g., ink-jet, laser, etc.) or a large clustered on-demand document printer.

In various aspect of the exemplary embodiment, local visually recognizable regions of the document are used for determining a pointing location of a suitable optical input device such as a webcam or pen-camera, relative to the document. The document includes a plurality of discrete pointing locations, each of which is associated with accessible information. The document includes a plurality of discrete pointing locations, each of which may be associated with accessible information which is stored in a location which is remote from the document. Each of the discrete pointing locations is distinguishable from the other discrete pointing locations when the document or portion thereof is presented to the optical input device. The document includes disambiguating information which is added to the visually recognizable portions of the image for supporting unique location identification of a pointing location. The disambiguating visual information comprises machine readable information, such as a marking or a collection of markings, which is visually unobtrusive to a human reader, but which is sufficient to allow each discrete pointing location to be distinguished from all other discrete pointing locations in the document by a machine. A marking or collection of markings, even if visible, is considered to be visually unobtrusive if it does not obstruct a human's visual perception of other visible markings printed in the same area of the print medium. The disambiguating information can be in the form of random noise or a watermark, and may include modifications to localized regions of the image by changing a color or gray level of bit of the image associated with the pointing locations. In one embodiment, this is achieved with a minimal amount of noise added, and only if disambiguation is necessary for the region under consideration. The information is considered to be noise when it aids in localization but does not of itself provide localizing information. A watermark serves as disambiguating information which can be used in localization but also provides information which can be independently used to identify a particular pointing region ("intelligent information"). The disambiguating information includes machine-readable markings which can be invisible or can be visually unobtrusive markings.

The disambiguating information can be added to the hardcopy document as part of the printing process, such as by printer driver software, by a Postscript engine in a printer.

Markings are considered to be machine readable if techniques are available for automatically obtaining the information from signals that include information about the markings. Markings are considered to be human readable if humans can perceive the markings and extract information therefrom.

By showing the printed document to a computer device with a suitable associated optical input device (e.g., a pen-camera or webcam), the machine-readable information is decoded, and used to invoke a computer implemented process. Specifically, the machine-readable markings within an observed region of the printed document encode a location identifier. The machine-readable markings are decodable to obtain the location identifier by a processing component in the computer device. The optical input device may include detection circuitry. Input signals from the detection circuitry, including information defining the machine-readable markings are input to the processing component. The location identifier may specify an action device using a globally unique identifier that identifies the document and an action using a location identifier that identifies a region of the hardcopy document. The processing component may be adapted to provide the location identifier through a network to an action device to produce the action. The action may relate to the region of the document. The action device may provide the action automatically in response to the location identifier.

With reference to FIG. 1, an exemplary system for invoking a computer implemented process, such as the provision of information associated with pointer locations in a document, includes an optical input device 10 capable of capturing a localized region 12 of a document 14 embodied on a print medium such as a sheet 16 of paper or multiple sheets of paper. In the illustrated embodiment, the localized region 12 is circular although other shapes are contemplated. The optical input device 10 is associated with a computer device 18, which is configured for invoking a computer implemented process. The computer implemented process may include displaying information associated with the pointing location on a screen 20 or other suitable visual or audible information output device, such as a landline telephone, cell phone, PDA, MP3 player, radio, or the like. Other computer implemented processes are also contemplated, such as ordering a part from a catalog, downloading music, or providing other information associated with the pointer location to a user. The computer device 18 may be linked to the optical input device 10 by a suitable wired or wireless link 22, whereby information extracted from the document by the optical input device 10 is communicated to the computer device. In an alternative embodiment, at least one of the computer device and the output device 20 is incorporated into a body (not shown) of the optical input device 10.

The optical input device 10 defects markings, e.g., by taking a digital snapshot of the observed region 12, and provides signals that include information about the markings. Suitable optical input devices 10 are described, for example, in U.S. Pat. No. 6,330,976, the disclosure of which is incorporated herein in its entirety, by reference.

The document 14 may include one or more machine readable identifiers 30 which allow the computer device 18 to identify the document or a portion thereof, such as a page of the document. Unique document identification need not provided locally, such as at each pointer location, but can be provided globally. For example, a global identifier 30, such as a Dataglyph identifier is provided on a cover page of the document. The global identifier 30 can be read once and thereafter provides the context for the subsequent pointing actions. An identifier 30 is considered to be a global identifier if it maps to at most one digitally stored document.

As illustrated in FIGS. 2 and 3, the document 14 includes disambiguating information 32, which is added to the original document from which the hardcopy document 14 is derived, generally at the time of printing the document. An election to provide a document with localization capabilities in the printed output can be made by the user. This election can be made once, e.g., at the time of printer driver installation, and consistently applied thereafter. Or it can be made on a print-job by print-job or page by page basis, e.g., through a print dialog presented by the application program when the user requests printed output. Or the localization capability can be added all the time, without any user election or involvement.

A user may manipulate (e.g. position or move with a wiping action) the optical input device 10 to capture local images of regions 12 of the document 14 and provide input signals defining the captured images. Data derived from the captured images is used by the computer device to identify an associated computer implemented process.

Figure 4:
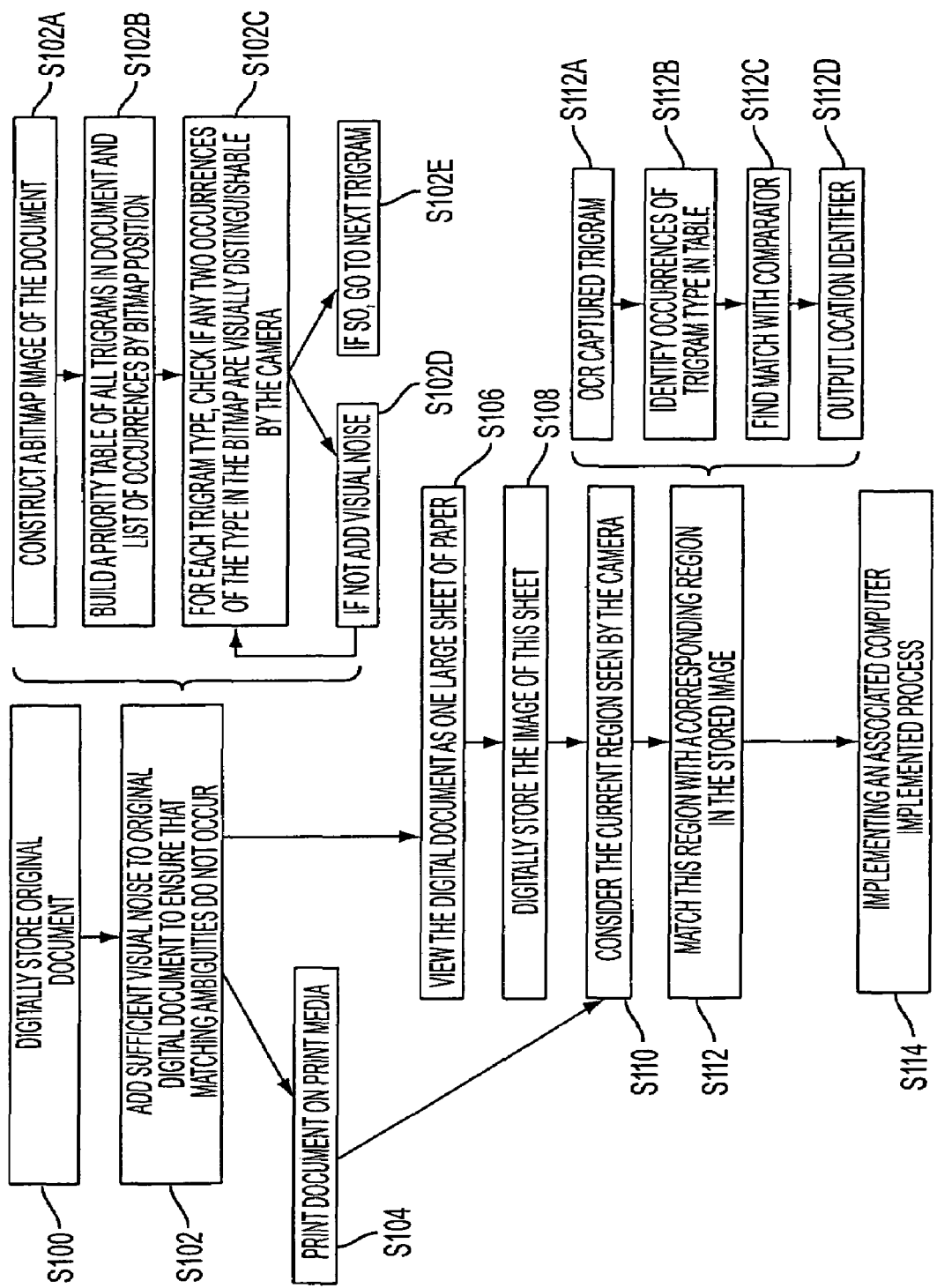
FIG. 4 is a flow diagram of a process for creating a hardcopy document with internal localization and for initiating a computer implemented process with the document.

As illustrated in FIG. 4, a method for storing a document and implementing a computer implemented process may include the following steps. It will be appreciated that the steps may be performed in a different order from that illustrated or that fewer or additional steps may be performed. At step S100, an original electronic document to be rendered on the print-medium is provided. At step S102, sufficient disambiguating information (e.g., noise) is added to the document to ensure that matching ambiguities do not occur, thereby generating an electronic localizable document. At step S104, a physical localizable document is generated, e.g., a hardcopy of the disambiguated localized document is printed (it will be appreciated that this step may be performed later). At step S106, the disambiguated localized electronic document created in step S102 is viewed as one large sheet of paper (that is, which displays all the pages next to each other). At step S108, the image of this sheet is digitally stored. At step S110, a user provided with the physical document, moves the pen camera to a location of interest on the document. The current region seen by the camera (such as a centimeter-square area or a circle which encompasses such an area) is considered by the computer device 18. At step S112, this region is matched with a corresponding region in the stored image. The amount of visual noise that was added to the original document is sufficient to ensure that matching ambiguities do not occur.

The essence of the exemplary embodiment may be summarized in two "equations":

localizable document=original document+disambiguating visual noise pointer localization=camera region←match→document region The approach can be used for all areas of the document, whether text or images. In an exemplary embodiment, a method which can be applied to text as well as to images is described; the specific techniques for both cases will be described in turn. An embodiment suitable for textual regions is described first. Then a specific embodiment for image regions is described. The latter embodiment is conceptually simple but tends to incur higher computational cost than the textual regions.

In one embodiment, the method is applied to textual regions of a document. Textual regions include regions in which characters from a finite set of recognizable characters are arranged, generally in horizontal strings of characters. The characters may comprise letters, numbers, mathematical symbols, punctuation marks, combinations thereof, and the like. The characters in the text are generally of the same size or selected from a finite set of character sizes. In one embodiment, each character is uniquely recognizable, for example, using optical character recognition (OCR). However, as will be appreciated, each character may be repeated in the original document a plurality of times. An Ngram comprising a sequence of N characters may also be repeated in the original document multiple times. Thus, unique localization relying on identification of individual characters or Ngrams is not generally possible for most documents.

The object is to allow a user to point the pen-camera to a certain textual region of the hardcopy document 14 and allow the position of the pen-camera to be recovered, relative to the document. The pen-camera generally has a viewing diameter that allows it to take in at least N characters, where N is an integer. In the illustrated embodiment, N=3 characters (a trigram), with at most one of the characters being a space. It will be appreciated that N can be fewer or greater than 3, such as for example, from 1 to 10, depending on the size of the camera snapshot and the character size. The electronic document may be represented in PDF or other suitable format.

As illustrated in FIG. 1, an exemplary embodiment of computer device 18 is shown. The computer device 18 may be entirely local to the pen camera 10 or may be distributed such that parts of the computer device, such as some of the processing, memory, and retrieval components, are located remote from the pen camera 10 and are accessed via a network connection, internet connection or the like. For purposes of discussion of the exemplary embodiment, local processing is handled by a workstation CPU 40 or other local device which communicates with a central processor 42 via a wired or wireless link 44. The central processor 42 includes a memory component 46 which temporarily stores the observed region 12 of the document in electronic form 50 and a processing component 52, which matches the observed region 12 with a corresponding region of the electronically stored document and generates a location identifier corresponding to the location of the observed region in the document. The illustrated processing component, which is particularly suited to text recognition, includes a raw processor 54, such as an optical character recognition processor (OCR) which is capable of identifying, raw, unrefined markings, such as characters, in the captured region 48. The processing component 52 may be in communication with a database memory 56 which stores a bitmap of the document. The memory component 46 also stores a collision list, e.g., a table 58 comprising trigrams 60 recognizable by the OCR, and associated localization information 62, such as x, y coordinates of the trigram location in the document. The processing component 52 also includes a comparator 64, which serves as a fine processor for comparing the observed region 12 with each occurrence of the OCR'd trigram in the document. The comparator is capable of distinguishing relatively small differences between two trigrams of the same type. Multiple occurrences of the data are distinguishable by the disambiguating information which is captured along with the markings. The comparator 64 identifies the closest match and retrieves the associated location identifier. The location identifier is used to initiate a computer implemented process. For example, the processing component 52 communicates with an action processor 68 which provides an automatic action, such as retrieving web pages, ordering parts form a catalog, providing geographical information, or the like. The interactions between the components and alternative configurations of the system will be appreciated from a description of the method.

The method includes two distinct stages: the first step is creation of a localizable document and the second step includes retrieval of a location identifier using the localized document. At document construction time, the following steps may be implemented, as illustrated in FIG. 4. At step S100, a bitmap image of the document is constructed. Step S102, which is the step of adding disambiguating information, may include the following substeps. At substep S102A, a bitmap image of the document is created. At substep S102B, collision lists are built. In the case of textual regions, this may comprise building an a priori table 58 (FIG. 1) of all character trigrams 60 in the document which are recognizable by the OCR, with one entry per trigram type (e.g., the trigram "new", comprising the three characters n, e, and w, illustrated in FIG. 2), and with an associated list of occurrences of this trigram type in the document. Trigrams may be scaled to a common size prior to forming the table. For each such occurrence of a trigram type, the position 62 at which it occurs in the bitmap image is recorded in the table. The position may include x, y coordinates of a pixel in one of the characters, such as the first character in the trigram 60. For each trigram type, the document generation software (not illustrated) checks that each occurrence of the trigram type in the bitmap is visually distinguishable by the camera (Substep S102C). The document generation software comprehends the capabilities of the comparator 50, which provides finer recognition processing of the trigram than the OCR. Initially, two or more occurrences of the trigram "new" will generally be considered identical and thus visually indistinguishable. Where the two or more trigrams are not visually distinguishable, a small increment of "random visual noise" 32 or other disambiguating information is added to each occurrence of the trigram 60 in the bitmap (Substep 102D). The processor then returns to substep S102C and checks if the trigrams 60 of the same type are visually distinguishable (by the camera/comparator). Substeps S102C and S102D may be repeated two or more times, adding incrementally more noise 32 until all the trigrams 60 of the same type are distinguishable. In this way, a minimum amount of noise 32 needed to distinguish them is added. Once all the trigrams 60 are distinguishable, the next trigram type is subjected to substeps S102C and S102D, until all trigram types in the document have been processed (Substep S102E).

At localization time (Step S110) the bitmap region 12 seen by the camera is captured. Step S112 may include the following substeps: First, OCR the captured region to retrieve three consecutive characters, the observed trigram (Substep S112A). It will be appreciated that the region seen by the camera may encompass more than three characters, in which case, a trigram is selected, such as the first trigram capable of OCR. At Substep S112B, the trigram table 58 may be consulted with the observed trigram, and all occurrences of the trigram type are identified. The observed trigram may be scaled to the common size used in the table prior to consulting the table. This OCR step may involve a relatively unrefined character comparison, where the disambiguating noise is ignored. A proximity match of the captured bitmap region with the bitmap regions associated with the different occurrences of this trigram in the document table is then performed with the comparator 64 (Substep S112C). In this step, the visual noise added to repeat occurrences of the trigrams is used to find the trigram occurrence which most closely matches the observed trigram. The document location of the closest occurrence is then output (Substep S112D). The output location identifier can be used to determine the exact position of the camera-pen or to implement a computer implemented process (Step S114).

In one embodiment, if the OCR is unable to identify a single trigram type with certainty (at Substep S112A), the OCR may output a small number of candidates, such as two to five candidates, and the union of the corresponding set of occurrences can be used for evaluation at Substeps S112B and S112C.

It will be appreciated that the table of trigrams 60 may be stored locally in the pen body, or on some external device such as workstation 40 or central processor 42, with which the pen communicates.

An exemplary process of adding visual noise to bitmap regions associated to the trigram occurrences will now be described in greater detail. As illustrated in FIG. 2, at each iteration of Substep S102C, a few, e.g., two or more contiguous pixels 32 are randomly selected in a region 70 which does not impair OCR of the characters 72, such as in the white regions surrounding the characters 72. The selected pixels 32 are given a certain value of grey (or, in a variant, just given a black value). The iterations are stopped when the level of noise (pixels 32) added in this way is sufficient for the camera to distinguish all the occurrences of the given trigram. As can be seen for example in FIG. 2, each character 72 may have one or more associated visual noise regions 32 proximate thereto. The visual noise associated with one character of the trigram appears in a different location in the next occurrence of the trigram, and so forth. For example, looking at the letter "e", visual noise 32 is added in the first trigram occurrence proximate the lower right of the character, while in the second occurrence, visual noise is added in the enclosed white space near the top of the character. It will be appreciated that although every character 72 may be associated with one or more visual noise regions 32, one or two of the characters 72 in the trigram may have no associated visual noise.

Many other techniques for adding disambiguating information are possible, some inspired by "steganography" as disclosed, for example, in D. Sellars, "An Introduction to Steganography," at http://www.totse.com/en/privacy/encryption/
163947.html.

For example, one method of adding disambiguating information is to randomly shift the characters 72 in the trigram relative to each other ("word-shift coding"), or to alter certain features of the characters ("feature coding", e.g. altering the length of vertical endlines in characters such as b, d and h). Another method of adding disambiguating information is to perform binary image watermarking, as described, for example, in Y.-Y. Chen, H.-K. Pan, and Y.-C. Tseng, "A Secure Data Hiding Scheme for Binary Images," IEEE Trans. on Communications, Vol. 50, No. 8, (August 2002) and Min Wu and Bede Liu, "Data Hiding in Binary Image Authentication and Annotation," IEEE Transactions on Multimedia, Vol. 6, No. 4 (August 2004). These techniques embed information in a redundant way that allows a more robust detection.

Another alternative is to 'watermark' each trigram e.g., with the trigram's position in the trigram table. For example, the third occurrence of the trigram "new" in the table may be accompanied by a watermarked "3" in the document, adjacent the trigram, to accelerate the retrieval. The watermark is sufficiently small to be visually unobtrusive and allow OCR of the characters. Microprinting techniques exist for adding numbers or other characters as small print which is almost unnoticeable to the eye, for example, using high-end laser printers. Such techniques may be employed to add the disambiguating information in appropriate locations.

It should be noted, however, that while the purpose of steganography is traditionally to hide information in the document, unnoticed by the reader, for purposes such as authentication, copyright control, or covert communication, the purpose here is not hiding information per se, but rather adding disambiguating information in a way which is visually minimally disturbing, for localization purposes.

In this approach to pointer localization, it is possible to rely on a very convenient property of textual regions: the character-name is a powerful invariant feature of the character-bitmap, and such a feature can be used as an efficient search key for matching textual regions. For image regions, i.e., those portions of the document which cannot readily be distinguished using optical character recognition techniques, such as graphics and pictures, other approaches may be used, as described below. As with the textual recognition method described above, the image recognition method also adds disambiguating information to regions of the image to allow localization of the pen camera.

It will be appreciated that localization of the pointer in image regions is more demanding in terms of resources (storage space, processing time) than when working with textual regions. The following approach is conceptually simple, but of relatively high computational cost. As with the textual method, the initial steps include constructing a bitmap of the document (Step S102A), adding sufficient disambiguating information to the document to ensure that matching ambiguities do not occur (step S102), creation of a physical localizable document (Step S104), viewing disambiguated localized electronic document as one large sheet of paper (Step S106) and digitally storing the image of this sheet (step S108). At localization time, the process includes movement of a pen camera over the physical document (Step S110), matching the observed region with a corresponding region in the document (Step S112).

Figure 5:
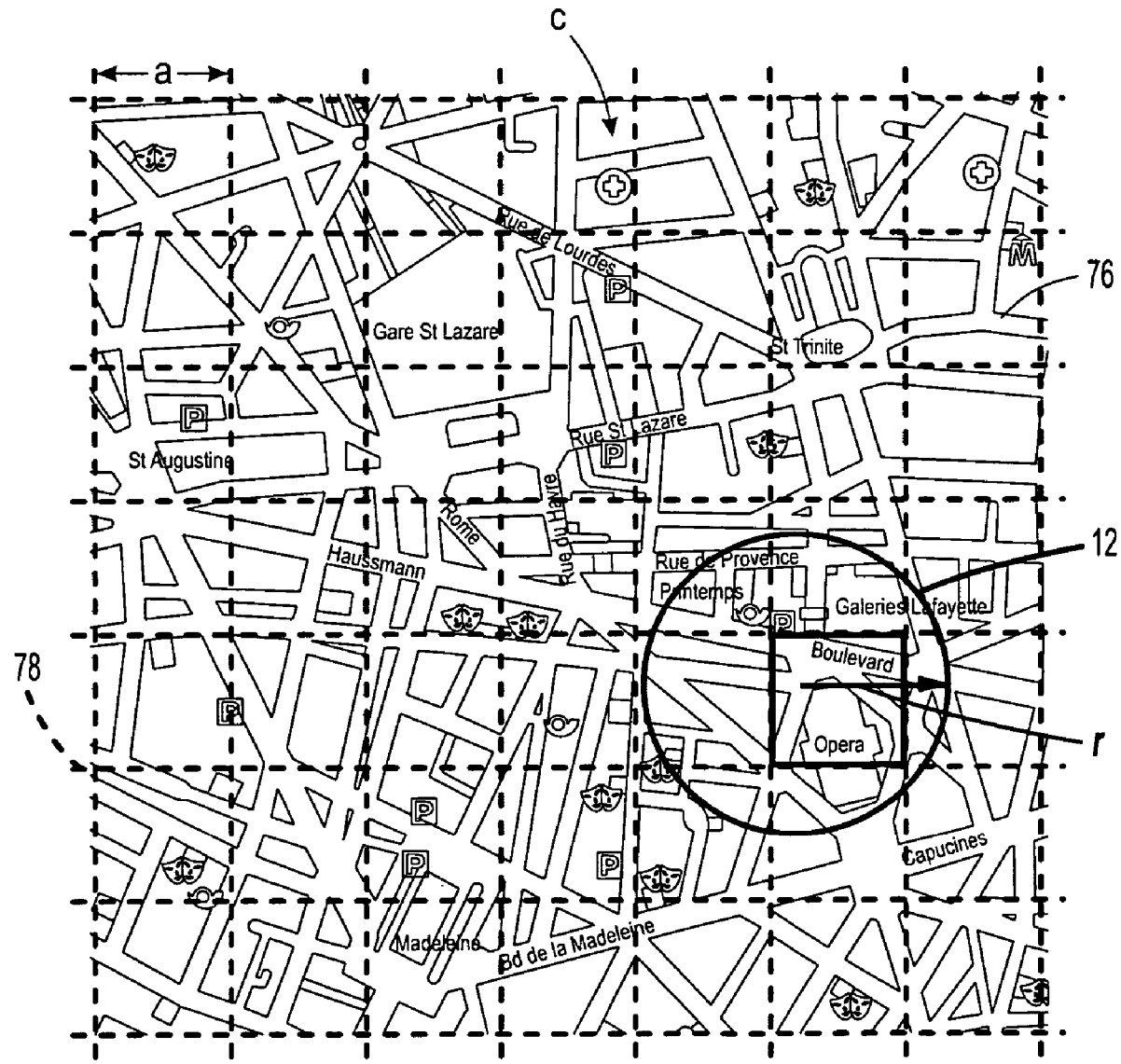
FIG. 5 is a schematic view of a grid superimposed on a digital document, illustrating an observation region of an optical input device.

At substep S102B, collision lists 60 are built. With reference to FIG. 5, an exemplary image portion 76, such as a page of a document in the form of a map, is shown. First, the collection of images 76 in the document are considered, which are assumed for purposes of discussion to be rectangular. On each image, a square grid comprising 78 cells c of equal width and height a is defined. The cell width a is taken at a sufficiently small value that the following property holds: for any snapshot taken by the camera 10, the snapshot contains at least a cell of the grid. For example, if snapshots 12 are assumed to be circular of radius r, then $$a \leq r/\sqrt{2}.$$

In addition to the grid cells shown in FIG. 5, additional cells (square regions of width a) are defined by incrementally shifting the grid cells in x and y directions by fixed amounts, such as in increments of from 1 to 10 pixels. For each grid cell c in the finite collection of grid cells cc for all images of the document, a "collision list" 58 is determined. The collision list 58 is a set of "collision candidates," that is square regions of width a (not necessarily aligned with grid cells shown in FIG. 5, but of the same size), which occur in one image of the document, and for which the visual difference with the cell c is smaller than a certain threshold.

For example, in order to determine the collision list, the grid cell c is moved by increments of one pixel at a time over the whole surface of the different images, registering the difference at each move, and registering a hit each time this difference is smaller than the threshold. Only candidates which are at a certain minimum offset from each other are maintained in the collision list, so as not to list twice some region which corresponds to undistinguishable pointing locations. This avoids spurious effects such as listing twice two regions which are offset by one pixel and are visually similar, but actually correspond to the same pointing action. For example, the minimum offset may be $\geq$a.

The time taken to construct the collision list is obviously quite large: for each cell c, on the order of N matches are performed, where N is the total number of pixels in the document images.

Improvements of this simplistic matching procedure are possible by using more sophisticated image-correlation techniques. For example, matching techniques described by Nillius and J. O. Eklundh, "Fast Block Matching with Normalized Cross-Correlation using Walsh Transforms," Report, ISRN KTH/NA/P-02/11-SE (2002); Natsev, R Rastogi and K. Shim, "WALRUS: A Similarity Retrieval Algorithm for Image Databases", IEEE Transactions on Knowledge and Data Engineering, 16-3 (2004); and Gupta and R. Jain, "Visual Information Retrieval," CACM (1997). For example, given a certain cell c, it is possible to use these techniques to find regions of the document images which are highly correlated with a given cell c more efficiently than through one-pixel-at-a-time iterations. These high-correlation regions can then be used as the elements of the collision list.

For each grid cell c, a collision list $[sr_1, \ldots, sr_k]$ 58 is built which includes all square regions (cells) $sr_1, \ldots, sr_k$ that are indistinguishable from cell c. As with the textual method, the next step is to add disambiguating information to distinguish between confusable regions. For example, one or more of the regions in the set $S=\{c, sr_1, \ldots, sr_k\}$ is modified slightly in such a way that they become pairwise distinguishable.

In one method, an operation analogous to that used in the case of textual regions is repeated a number of times: Check that any two elements of S are visually distinguishable by the camera (Substep S102C). If so, go to next pair. If not, add a small increment of "random visual noise" to each element of S, and go back to Substep S102C.

There are many ways to add incremental random noise to the regions of S. A simple option is take a few random pixels in each region, and alter their RGB values in some way (for instance replacing a light pixel by a dark one or vice-versa). The noise added is sufficient for the pen camera snapshot to be distinguished from the other similar occurrences. For more sophisticated approaches, techniques developed in the fields of steganography, watermarking, and more generally "information hiding" may be employed, as described for example, in Shoemaker, "Hidden Bits: A Survey of Techniques for Digital Watermarking," Independent Study, EER-290 (2002); G. Csurka, F. Deguillaume, J. Ruanaidh and T. Pun, "A Bayesian Approach to Affine Transformation Resistant Image and Video. Watermarking," in Lecture Notes In Computer Science, Vol. 1768 (1999); and F. Peticolas, R. Anderson, and M. Kuhn, "Information Hiding—A Survey," Proceedings of the IEEE, Special Issue on Protection of Multimedia Content, 87(7) (July 1999). Unlike many applications in these fields, the present application does not require that the disambiguating information be recovered and exploited for its own sake, rather, that it is only necessary to add random information for purpose of image disambiguation.

Some of the techniques for adding disambiguating noise which may be used in the present application include altering the values of low-significance bits (LSB) in the RGB representation of pixels (e.g., in the white background areas of the map illustrated in FIG. 5); correlation-based watermarking (adding to images pseudo-random noise generated by a key and retrieving this key by auto-correlation techniques); frequency-domain transform (transformation on a discrete Fourier transformation of the image which when inverted modifies the image globally but in a non-noticeable way); and wavelet transform (a similar idea, but using wavelets). The advantage of many of these techniques (with the exception of the LSB approach) is that they are designed to be resistant to some transformations such as scaling, rotation, and lighting variations. Such transformations may arise when an image portion is captured with a camera. As with the textual method, the embedded information can correspond to the cell's position in the collision list.

Retrieving the location may proceed as follows: Once a snapshot 12 is taken by the camera, one way to retrieve its location is through classical image correlation techniques. For example, the best match of the snapshot in the reference document image (or list of images) is found. The match contains at least one grid-cell region c. Because of the pre-disambiguation that was performed on the grid-cell regions through addition of visual noise, this region corresponds to a unique grid cell location, which allows the grid to be superimposed over the snapshot and therefore permits a precise determination of the pointer's location (e.g., at the center of the snapshot 12) relative to the document, as shown in FIG. 5. The snapshot can only match at one location on the grid, otherwise some grid cell region would appear twice in the document. The center of the pointing action (center of circle) can then be precisely located relative to the document.

An alternative to the above mentioned grid cell method is a descriptor-based approach. At decoding time, instead of attempting to match a camera snapshot over the whole document, only the snapshot 12 need be matched with document regions which share certain visual descriptors with the snapshot. At location time, the same technique can be used to locate quickly regions that may collide with a given grid cell. As will be appreciated, the OCR method described above for text documents and text regions of documents is a specialized application of a descriptor-based approach.

The computational cost can be significantly reduced by replacing a simple matching approach with the use of some specific location descriptors. For example, if the relevant actionable regions are rich in texture information, a corner based detector may be used. Several exemplary detectors of this type are described, for example, in C. Schmid, R. Mohr and C. Bauckhage, "Evaluation of Interest Point Detectors," in International Journal of Computer Vision, 37(2), 151-172 (2000). The corner based detector can extract all the corners in the image and consider only cells centered on those points. The collision list 58 is then built only for those cells as described above. The advantage of those points is that they are resistant to scale, rotation and illumination changes so that during the location step, a determination the center of the cell can be ascertained.

Another optimization is possible if specific region descriptors are use to describe the cells, as described, for example, in K. Mikolajczyk and C. Schmid, "A Performance Evaluation Of Local Descriptors," in IEEE Transactions on Pattern Analysis and Machine Intelligence, Vol. 27, No. 10 (October 2005).

The advantages of using local descriptors are not only in lower cost but also in resistance to scale, rotation, and illumination changes. To disambiguate cells in the collision list noise, e.g., random noise or watermarks can be added. In this case, the correlation is done only between the query cell and the list of cells having the same descriptor. These descriptors can be used to build cell tables (collision lists) in a way similar to the trigrams recognized by OCR in text.

In some applications, only certain regions in the image are actionable (i.e., are associated with a location identifier which initiates a computer implemented process). As a result, the regions that need to be disambiguated are further limited. Only sufficient disambiguating information need be added to the document such that every active region is distinguishable.

Once the localization of the pointing action is determined, a computer implemented process may be invoked by the processor. Exemplary actions which may be associated with the pointing gesture include the display of touristic information about a monument pointed to on a map, ordering a mechanical part from a paper catalog, retrieving the stored translation of a selected piece of text, playing a recorded interpretation from the position indicated by the pointer on a musical partition, or generally any action that can be triggered by using a mouse with a computer screen. Other examples of uses for intelligent paper which could be implemented with the exemplary embodiment are described, for example, in M. Dymetman and M. Copperman, "Intelligent Paper," in Electronic Publishing, Artistic Imaging, and Digital Typography, pp. 392-406 (R. Hersch, J. Andr, H. Brown, Eds., Springer-Verlag, 1998) and in U.S. Pat. No. 6,752,317 to Dymetman, et al.; U.S. Pat. No. 6,959,298 to Silverbrook, et al. (effecting travel services); U.S. Pat. No. 6,963,845 to Lapstun, et al. (enabling authority to transmit electronic mail using a business card); U.S. Pat. No. 6,847,883 to Walmsley, et al. (identifying a geographic location on a map, the disclosures of which are incorporated herein by reference in their entireties.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for document internal localization comprising:
identifying, for a multiplicity of regions of an electronically stored document, if there are regions which are indistinguishable, by an automated processing component, from other regions in the multiplicity of regions;
in the event that regions which are indistinguishable are identified, for a set of regions which are indistinguishable from each other, adding machine readable disambiguating information to at least one of the regions in the set whereby the regions in the set of regions are distinguishable by the automated processing component;
associating each of the regions in the multiplicity of regions with a corresponding location in the electronic document;
generating a hardcopy document from the electronic document;
comparing an observed region of the hardcopy document with a first region in the multiplicity of regions with the automated processing component and, where the observed region of hardcopy document is indistinguishable from the first region, retrieving the location associated with the first region.

2. The method of claim 1, further comprising:
automatically initiating a computer implemented process associated with the retrieved location.

3. The method of claim 1, further comprising:
identifying, from among the multiplicity of regions of the electronically stored document, regions which are distinguishable from all the other regions in the multiplicity of regions, by the automated processing component, without addition of disambiguating information.

4. The method of claim 3, further comprising:
adding no disambiguating information to the regions which are distinguishable from all the other regions of the electronically stored document.

5. The method of claim 1, wherein electronically stored document includes text characters and wherein the identifying of the set of regions includes comparing a group of N text characters in a first of the regions with a group of text characters in the second region, wherein N is at least two.

6. The method of claim 5, wherein the comparing of the observed region of the hardcopy document includes:
identifying a group of N text characters in the region with optical character recognition;
retrieving regions of the electronically stored document which include the same group of N text characters; and
comparing the retrieved regions with the observed regions to identify a retrieved region having disambiguating information which matches the disambiguating information of the observed region.

7. The method of claim 1, wherein the adding of disambiguating information includes at least one of adding random noise and watermarking.

8. The method of claim 1, wherein the identifying of the set of indistinguishable regions and the adding of disambiguating information are performed by an automated processing component.

9. The method of claim 1, wherein each of the multiplicity of regions is associated with a corresponding location in the electronic document.

10. The method of claim 1, wherein the generation of the hardcopy document from the electronic document comprises printing the disambiguating information on print media.

11. The method of claim 1, wherein the identifying of the set of the regions which are indistinguishable includes generating a collision list which lists the regions in the set together with their locations in the electronically stored document.

12. The method of claim 11, wherein the generating of the collision list includes generating a plurality of collision lists, each list including locations of a plurality of regions which are indistinguishable from other regions in the set but which are distinguishable from regions in other sets.

13. A system for generating a document with internal localization capability comprising:
a processing component which determines whether actionable regions of an electronically stored document associated with a pointing action are distinguishable,
the processing component adding sufficient machine readable disambiguating information to the electronically stored document to render the actionable regions associated with a pointing action which are indistinguishable without the disambiguating information distinguishable, the processing component being configured for generating a collision list which lists regions in a set of regions which are indistinguishable without disambiguating information together with their locations in the electronically stored document; and a memory which stores the electronically stored document with the machine readable disambiguating information.

14. The system of claim 13, wherein the memory stores a location identifier for each actionable region of the document.

15. A system for document internal localization comprising:

a user-positionable optical input device for capturing a local image of a user-observed region of a hardcopy document;

a processing component which determines a location of the observed region within the document by matching the captured image of the region with a corresponding region of an electronically stored version of the hardcopy document, the hardcopy document and electronically stored version of the document including machine readable disambiguating information whereby a region is distinguished from similar regions within the document, the disambiguating information being localized in regions of the document which are not distinguishable without the disambiguating information.

16. In combination, An an article of manufacture for obtaining automatic actions through a network, and the system of claim 15, the article of manufacture comprising:

print medium;

visually recognizable machine-readable markings on the print medium; and visually unobtrusive machine readable markings localized in regions of the print medium which are indistinguishable from other regions by the visually recognizable machine-readable markings alone, the visually unobtrusive machine readable markings being absent from at least some regions which are distinguishable by the visually recognizable machine-readable markings alone, the visually recognizable markings combining with the visually unobtrusive markings to render regions that are associated with an automatic action distinguishable from other regions that are associated with a respective automatic action, whereby the processing component associates a region of the article observed by the optical input device with a location identifier, the action device providing the action automatically in response to the location identifier.

17. The combination of claim 16, wherein the article comprises a hardcopy document.

18. The combination of claim 16, further comprising a machine readable global identifier which identifies the article.

19. A system for document internal localization of a pointing gesture comprising:

an optical input device which captures machine readable markings in a region of an associated hardcopy document;

memory which stores an electronic copy of the document;

a processing component which associates the captured machine readable markings with a location identifier corresponding to the location of the observed region in the hardcopy document and the corresponding electronic document, the location identifier automatically implementing a computer implemented process, the hardcopy document including disambiguating machine readable markings whereby otherwise indistinguishable regions of the hardcopy document are distinguishable by the processing component, the processing component being adapted to utilize visually recognizable machine readable markings for associating the region with the respective location identifier for those regions which are distinguishable without disambiguating markings and to utilize a combination of machine readable visually recognizable markings with machine readable disambiguating markings for associating the region with the respective location identifier for at least some of the regions which are indistinguishable without the disambiguating information.

\* \* \* \* \*